United States Patent
Nagai et al.

(10) Patent No.: US 7,800,847 B2
(45) Date of Patent: Sep. 21, 2010

(54) OPTICAL ELEMENT MODULE AND IMAGE PICKUP DEVICE

(75) Inventors: Nobuyuki Nagai, Kanagawa (JP); Akira Ono, Kanagawa (JP); Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 52 days.

(21) Appl. No.: 12/211,984

(22) Filed: Sep. 17, 2008

(65) Prior Publication Data

US 2009/0091829 A1   Apr. 9, 2009

(30) Foreign Application Priority Data

Oct. 4, 2007   (JP) .............................. 2007-260589

(51) Int. Cl.
G02B 7/02 (2006.01)
(52) U.S. Cl. ...................................... 359/813
(58) Field of Classification Search ................. 310/328; 360/77.12, 75, 234.5; 359/811, 813, 814, 359/819, 822–826
See application file for complete search history.

(56) References Cited

U.S. PATENT DOCUMENTS

| 2006/0028742 | A1* | 2/2006 | Yamashita et al. | 359/819 |
| 2007/0122132 | A1 | 5/2007 | Misawa et al. | |
| 2007/0285558 | A1* | 12/2007 | Oohara et al. | 348/345 |

FOREIGN PATENT DOCUMENTS

| JP | 1991-048229 | 3/1991 |
| JP | 2001-0666555 | 3/2001 |
| JP | 2001-174857 | 6/2001 |
| JP | 2002-228903 | 8/2002 |
| JP | 2006-101452 | 4/2006 |
| JP | 2006-145741 | 6/2006 |
| JP | 2006-301202 | 11/2006 |
| JP | 2007-060888 | 3/2007 |

(Continued)

OTHER PUBLICATIONS

Japanese Office Action dated Aug. 26, 2009, for corresponding JP Patent Application 2007-260589.

*Primary Examiner*—Jessica T Stultz
*Assistant Examiner*—Mahidere S Sahle
(74) *Attorney, Agent, or Firm*—K & L Gates LLP

(57) ABSTRACT

An optical element module includes an optical element, and a plurality of actuator elements. In the module, the plurality of actuator elements are arranged such that a direction of width of the oblong strip shape of the plurality of actuator elements is a direction of the optical axis and such that a direction of thickness of the plurality of actuator elements is perpendicular to the optical axis, another end part in a direction of length of the plurality of actuator elements is fixed such that one end part in the direction of length of the plurality of actuator elements is displaced by the bending to move the optical element, and at least one actuator element A of the plurality of actuator elements is disposed such that a direction in which the one end part of the actuator element A is displaced by the bending (X-direction) is orthogonal to a direction in which the one end part of another actuator element B is displaced by the bending (Y-direction).

13 Claims, 9 Drawing Sheets

FOREIGN PATENT DOCUMENTS

| | | |
|---|---|---|
| JP | 2007-114585 | 5/2007 |
| JP | 2007-129295 | 5/2007 |
| JP | 2007-140169 | 6/2007 |
| JP | 2007-143300 | 6/2007 |
| JP | 2007-147843 | 6/2007 |
| JP | 2007-158587 | 6/2007 |
| JP | 2007-192847 | 8/2007 |
| WO | 2005/122380 | 12/2005 |
| WO | 2007/063359 | 6/2007 |

* cited by examiner

FIG.5D
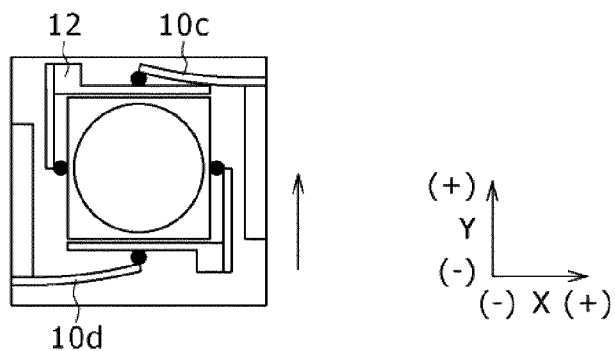
FIG.5C  FIG.5A  FIG.5B
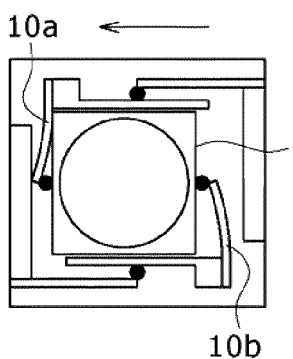 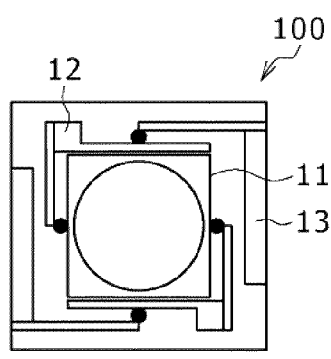 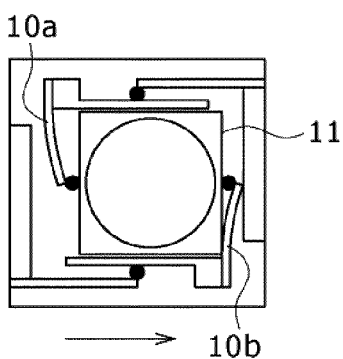
FIG.5E
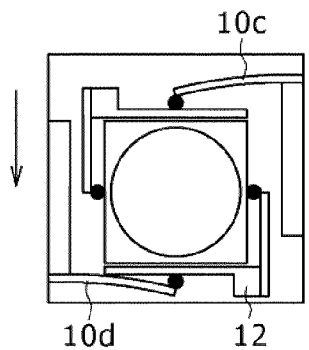

OPTICAL ELEMENT MODULE AND IMAGE PICKUP DEVICE

CROSS REFERENCES TO RELATED APPLICATIONS

The present application claims priority to Japanese Patent Application JP 2007-260589 filed in the Japan Patent Office on Oct. 4, 2007, the entire contents of which is being incorporated herein by reference.

BACKGROUND

The present application relates to an optical element module using a polymer actuator element, and an image pickup device that makes hand movement correction using the optical element module.

A hand movement correcting function has recently been becoming a standard in a digital camera with increase in the number of pixels and improvement in functionality. An optical hand movement correction, in particular, has recently been incorporated in addition to a digital hand movement correction (for example, see Japanese Patent No. 3516110, hereinafter "Patent Document 1").

In the case of optical hand movement correction, however, an actuator mechanism using magnetism such as a linear motor as in the example of the above-mentioned Patent Document 1 or the like is mainly employed. Therefore, the size of a module as a whole is increased, and it is difficult to make the size of a camera smaller.

In addition, a camera included in a portable telephone has been increased in the number of pixels, and is thus likely to need a hand movement correction in the future. However, it is very difficult for an actuator mechanism now in use to be of such a size as to be included in a portable telephone and be provided with an optical hand movement correcting function.

To address these problems, a hand movement correcting unit has recently been proposed (for example, see Japanese Patent Laid-Open No. 2007-140169, hereinafter "Patent Document 1"). However, the unit in Patent Document 2 utilizes the expansion and contraction of a polymer actuator. Thus, a space for the polymer actuator to expand and contract on the periphery of an optical element is required, and the unit as a whole is not sufficiently miniaturized.

SUMMARY

It is desirable to provide an optical element module that can be miniaturized by a simple structure using a polymer actuator and which can make hand movement correction, and an image pickup device using the optical element module.

In an embodiment, an optical element module is provided. The optical element module including: an optical element; and a plurality of actuator elements each having an ion conductive polymer film in an oblong strip shape and electrodes disposed on both sides of the ion conductive polymer film, the actuator elements as a whole bending in a direction of thickness by applying a voltage between the electrodes; the optical element being moved on a plane perpendicular to an optical axis of the optical element by the bending of the actuator elements; wherein the plurality of actuator elements are arranged such that a direction of width of the oblong strip shape of the plurality of actuator elements is a direction of the optical axis and such that a direction of thickness of the plurality of actuator elements is perpendicular to the optical axis, another end part in a direction of length of the plurality of actuator elements is fixed such that one end part in the direction of length of the plurality of actuator elements is displaced by the bending to move the optical element, and at least one actuator element A of the plurality of actuator elements is disposed such that a direction in which one end part of the actuator element A is displaced by the bending (X-direction) is orthogonal to a direction in which one end part of another actuator element B is displaced by the bending (Y-direction).

In an embodiment, optical element is one of a lens, a lens and a lens holder, and an image pickup element.

In an embodiment, the electrodes are a conductive film formed by dispersing carbon particles into a resin.

In an embodiment, each of the actuator elements is formed by laminating, in the direction of the thickness, a plurality of actuator elements each having electrodes on both sides of an ion conductive polymer film in a shape of an oblong strip.

In an embodiment, the optical element module further including: an inner frame for containing the optical element such that the optical element is movable in an X-direction; and an outer frame for containing the inner frame together with the optical element such that the inner frame together with the optical element is movable in a Y-direction; wherein the plurality of actuator elements include two actuator elements A whose principal planes are opposed to each other with the optical element interposed between the two actuator elements A in the X-direction, one end part of each of the two actuator elements A being in contact with the optical element, and another end part of each of the two actuator elements A being fixed to the inner frame, and two actuator elements B whose principal planes are opposed to each other with the inner frame interposed between the two actuator elements B in the Y-direction, one end part of each of the two actuator elements B being in contact with the inner frame, and another end part of each of the two actuator elements B being fixed to the outer frame, the optical element is moved in one direction of the X-direction by pushing due to the bending of one actuator element A of the two actuator elements A, and the inner frame and the optical element are moved in one direction of the Y-direction by pushing due to the bending of one actuator element B of the two actuator elements B.

In an embodiment, one of the two actuator elements A is a leaf spring in a shape of an oblong strip in place of the actuator element.

In an embodiment, one of the two actuator elements B is a leaf spring in a shape of an oblong strip in place of the actuator element.

In an embodiment, the optical element is supported by four actuator elements bent at 90° to 180° in a direction of thickness as an initial shape, the other end part of the actuator elements being fixed to a fixing frame, and the one end part of the actuator elements being fixed to the optical element, two actuator elements of the four actuator elements are arranged as actuator elements A whose principal planes are opposed to each other with the optical element interposed between the actuator elements A in an X-direction, and the optical element is moved in one direction of the X-direction by one of pushing and pulling of one end part of at least one actuator element A due to the bending by applying the voltage, and the other two actuator elements are arranged as actuator elements B whose principal planes are opposed to each other with the optical element interposed between the actuator elements B in a Y-direction, and the optical element is moved in one direction of the Y-direction by one of pushing and pulling of one end part of at least one actuator element B due to the bending by applying the voltage.

In an embodiment, the optical element is supported by two actuator elements bent at 180° in a direction of thickness as an initial shape, the other end part of the actuator elements being fixed to a fixing frame, and the one end part of the actuator elements being fixed to the optical element, one actuator element of the two actuator elements is arranged as an actuator element A with the optical element interposed between both end parts of the actuator element A, both end parts of the actuator element A being arranged in an X-direction, and the optical element is moved in one direction of the X-direction by one of pushing and pulling of one end part of the actuator element A due to the bending by applying the voltage, and the other actuator element is arranged as an actuator element B with the optical element interposed between both end parts of the actuator element B, both end parts of the actuator element B being arranged in a Y-direction, and the optical element is moved in one direction of the Y-direction by one of pushing and pulling of one end part of the actuator element B due to the bending by applying the voltage.

In an embodiment, the optical element is supported by two actuator elements, the other end part of the actuator elements being coupled to a fixing frame, and the one end part of the actuator elements being coupled to the optical element via an arm member such that a displacement of the one end part can be transmitted to the optical element, one actuator element of the two actuator elements is arranged as an actuator element A, and the optical element is moved in one direction of an X-direction by one of pushing and pulling of one end part of the actuator element A due to the bending by applying the voltage, and the other actuator element is arranged as an actuator element B, and the optical element is moved in one direction of a Y-direction by one of pushing and pulling of one end part of the actuator element B due to the bending by applying the voltage.

An image pickup device including the optical element module according to an embodiment in an image pickup optical system, wherein the optical element of the optical element module is moved on the plane perpendicular to the optical axis of the optical element at a time of image pickup to make hand movement correction.

According to an optical element module according to an embodiment, it is possible to utilize advantages of a polymer actuator of having a great generating force, a large amount of deformation, and high flexibility while having a small thickness and a light weight, and miniaturize the optical element module by a simple structure.

In addition, according to an image pickup device according to an embodiment, it is possible to miniaturize the image pickup device as a whole by using an optical element module according to an embodiment, and make hand movement correction by freely moving an optical element within a plane in a direction perpendicular to an optical axis.

Additional features and advantages are described herein, and will be apparent from the following Detailed Description and the figures.

BRIEF DESCRIPTION OF THE FIGURES

FIGS. 5A to 5E are top views showing states of driving of the optical element module of FIG. 1 according to an embodiment;

DETAILED DESCRIPTION

The present application will be described below in further detail with reference to the drawings according to an embodiment.

An optical element module according to an embodiment includes: an optical element; and a plurality of actuator elements each having an ion conductive polymer film in an oblong strip shape and electrodes disposed on both sides of the ion conductive polymer film, the actuator elements as a whole bending in a direction of thickness by applying a voltage between the electrodes; the optical element being moved on a plane perpendicular to an optical axis of the optical element by the bending of the actuator elements; wherein the plurality of actuator elements are arranged such that a direction of width of the oblong strip shape of the plurality of actuator elements is a direction of the optical axis and such that a direction of thickness of the plurality of actuator elements is perpendicular to the optical axis , another end part in a direction of length of the plurality of actuator elements is fixed such that one end part in the direction of length of the plurality of actuator elements is displaced by the bending to move the optical element, and at least one actuator element A of the plurality of actuator elements is disposed such that a direction in which one end part of the actuator element A is displaced by the bending (X-direction) is orthogonal to a direction in which one end part of another actuator element B is displaced by the bending (Y-direction). Thereby, a space required for a driving mechanism that moves the optical element is only the thickness of the actuator elements and the bending space of the actuator elements. Thus, a compact optical element module can be formed.

Figure 1A:
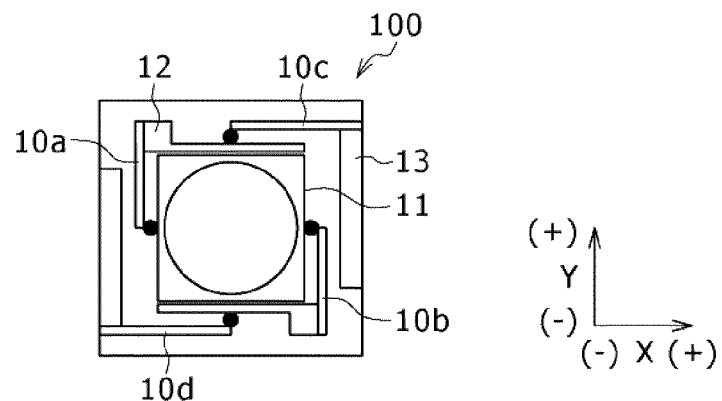
FIGS. 1A and 1B are schematic diagrams showing a constitution of a first embodiment of an optical element module according to an embodiment.
Figure 1B:
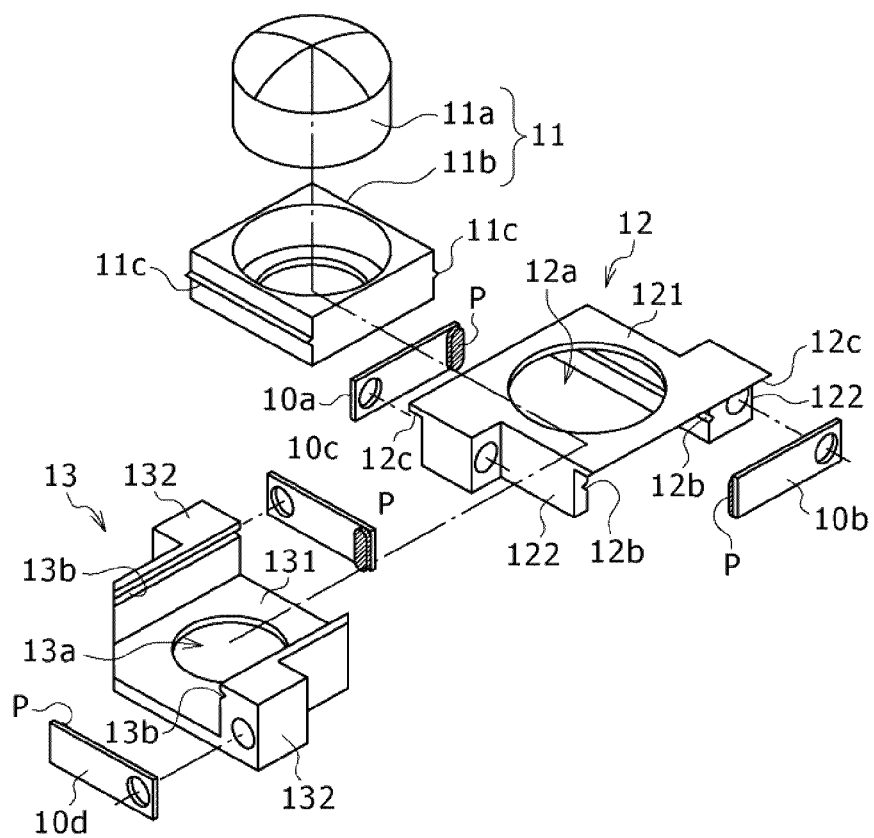

FIGS. 1A and 1B are schematic diagrams showing a constitution of a first embodiment of an optical element module according to an embodiment. FIG. 1A is a perspective view of an optical element module 100 as viewed from above along the optical axis of an optical element. FIG. 1B is an exploded view of the optical element module 100.

As shown in FIG. 1A, the optical element module 100 includes an inner frame 12 containing an optical element 11 such that the optical element 11 is movable in an X-direction (horizontal direction in FIG. 1A), which is one direction on a plane perpendicular to the optical axis of the optical element 11, and an outer frame 13 containing the inner frame 12 together with the optical element 11 such that the inner frame 12 together with the optical element 11 is movable in a Y-direction (vertical direction in FIG. 1A), which is one direction on the plane perpendicular to the optical axis of the optical element 11 and is a direction orthogonal to the X-direction. In addition, the optical element module 100 includes, as a plurality of actuator elements, polymer actuator elements 10*a* and 10*b*, which are two actuator elements A whose principal planes are opposed to each other with the optical element 11 interposed between the two actuator elements A in the X-direction, one end part of each of the two actuator elements A being in contact with the optical element 11, and another end part of each of the two actuator elements A being fixed to the inner frame 12, and polymer actuator elements 10*c* and 10*d*, which are two actuator elements B whose principal planes are opposed to each other with the inner frame 12 interposed between the two actuator elements B in the Y-direction, one end part of each of the two actuator elements B being in contact with the inner frame 12, and another end part of each of the two actuator elements B being fixed to the outer frame 13. Incidentally, the optical element module 100 is housed in a box-shaped fixing frame not shown in the figure.

The optical element 11 in this case includes a lens 11*a* and a box-shaped lens holder 11*b* having a hole that penetrates in the direction of the optical axis of the lens 11*a* and which retains the lens 11*a*. In addition, two sides of the lens holder 11*b* which sides are opposed to each other in the Y-direction are each provided with a convex part 11*c* (in the shape of a triangular prism) projecting in the form of a wedge and extending in the X-direction. Incidentally, in addition to this constitution, the optical element 11 may be an image pickup element such as a CCD (Charge Coupled Device) or the like.

The inner frame 12 is a case made of a resin or made of a metal which case contains the box-shaped optical element 11. The inner frame 12 includes a flat plate 121 provided with an optical axis hole 12*a* made in the direction of the optical axis of the lens 11*a*, and two guide rail blocks 122 in the form of blocks that are separated from each other at such a distance as to be able to house the lens holder 11*b* in the Y-direction on the flat plate 121 and which extend in the X-direction. A guide rail 12*b* as a groove into which the convex part 11*c* can be inserted is formed in sides of the two guide rail blocks 122 which sides are opposed to each other in the Y-direction. When the optical element 11 is fitted into the inner frame 12, the two convex parts 11*c* are inserted into the respective guide rails 12*b*. The convex parts 11*c* slide on the guide rails 12*b*, whereby the optical element 11 can be moved in the X-direction. The other end parts of the polymer actuator elements 10*a* and 10*b* are fixed one to each of the sides of the guide rail blocks 122 in the X-direction by bonding, fastening with a screw, or the like. One end part of the polymer actuator elements 10*a* and 10*b* is disposed so as to abut on a side of the optical element 11 in the X-direction via a contact P. In addition, in the guide rail blocks 122, excluding the sides to which the respective polymer actuator elements 10*a* and 10*b* are fixed, sides of the guide rail blocks 122 in the Y-direction are partially cut away so as to form a space for housing one end part of the polymer actuator elements 10*c* and 10*d* to be described later. A distance from the partially cutaway sides to the inner wall of the fixing frame is a sum of the thickness of the polymer actuator element and displacement spaces on both sides of the polymer actuator element, and is about 1.5 mm, for example. In addition, sides of the flat plate 121 in the X-direction are each provided with a convex part 12*c* (in the shape of a triangular prism) projecting from the guide rail blocks 122 to the outside in the form of a wedge and extending in the X-direction.

The outer frame 13 is a case made of a resin or made of a metal which case contains the inner frame 12 and the optical element 11. The outer frame 13 includes a flat plate 131 provided with an optical axis hole 13*a* made in the direction of the optical axis of the lens 11*a*, and two guide rail blocks 132 in the form of blocks that are separated from each other at such a distance as to be able to house the inner frame 12 in the X-direction on the flat plate 131 and which extend in the Y-direction. A guide rail 13*b* as a groove into which the convex part 12*c* can be inserted is formed in sides of the two guide rail blocks 132 which sides are opposed to each other in the X-direction. When the inner frame 12 is fitted into the outer frame 13, the two convex parts 12*c* are inserted into the respective guide rails 13*b*. The convex parts 12*c* slide on the guide rails 13*b*, whereby the inner frame 12 and the optical element 11 can be moved in the Y-direction. The other end parts of the polymer actuator elements 10*c* and 10*d* are fixed one to each of the sides of the guide rail blocks 132 in the Y-direction by bonding, fastening with a screw, or the like. One end part of the polymer actuator elements 10*c* and 10*d* is disposed so as to abut on the cutaway part of a side of the inner frame 12 in the Y-direction via a contact P.

In the optical element module 100 assembled as the above-described constitution, the polymer actuator elements 10*a*, 10*b*, 10*c*, and 10*d* to which no voltage is applied are in a state as of a leaf spring. Thus, the polymer actuator elements 10*a*, 10*b*, 10*c*, and 10*d* to which no voltage is applied are in an initial state shown in FIG. 1A, that is , the optical element 11 is retained so as to be positioned at the center of the optical element module 100.

Incidentally, while the optical element 11 and the polymer actuator elements 10*a* and 10*b* as well as the inner frame 12 and the polymer actuator elements 10*c* and 10*d* do not need to be fixed to each other, some gap is made and a projection or the like is provided so as not to obstruct movement, or the optical element 11 and the polymer actuator elements 10*a* and 10*b* as well as the inner frame 12 and the polymer actuator elements 10*c* and 10*d* are combined with each other via a hinge or a soft material so as not to obstruct operation. In FIGS. 1A and 1B, a contact P is provided to make a gap between the optical element 11 and the polymer actuator elements 10*a* and 10*b* and between the inner frame 12 and the polymer actuator elements 10*c* and 10*d*. In addition, a guide or the like is desirably provided between the optical element 11 and the inner frame 12 and between the inner frame and the outer frame in order to prevent the tilting of the lens 11*a*, the inner frame 12, and the outer frame 13.

In this case, the polymer actuator elements 10*a*, 10*b*, 10*c*, and 10*d* (hereinafter described collectively as a polymer actuator element 10) have the shape of an oblong strip. The polymer actuator element 10 may be a hitherto known actuator element disclosed in Japanese Patent No. 2961125, Japanese Patent Laid-Open No. Hei 11-206162 or the like. In addition, the following constitution, for example, is desirably used.

Figure 2:
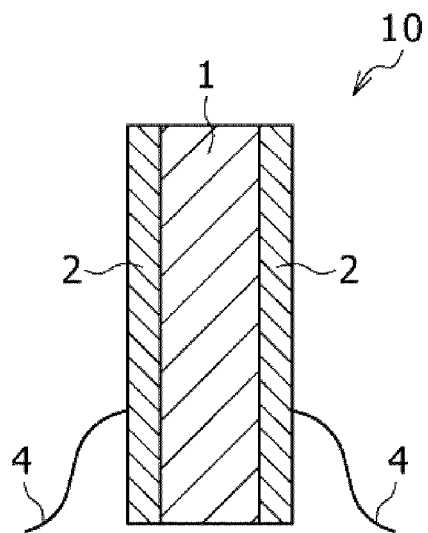
FIG. 2 is a sectional view of a constitution (1) of a polymer actuator element according to an embodiment.

FIG. 2 is a sectional view of a basic constitution of a polymer actuator element. Incidentally, an ion conductive polymer in this case is in the shape of a film as one form (ion conductive polymer film).

The polymer actuator element 10 includes an ion conductive polymer film 1 impregnated with a water base electrolytic solution, electrode films 2 provided on both sides of the ion conductive polymer film 1, and leads 4 electrically connected to the respective electrode films 2. The pair of leads 4 applies a voltage between the electrode films 2, whereby the ion conductive polymer film 1 is bent or deformed.

The ion conductive polymer film 1 is formed by an ion exchange resin having a fluoroplastic or a hydrocarbon base as a skeleton, and assumes the shape of an oblong strip having two principal planes on both sides. The ion exchange resin may be any of an anion exchange resin, a cation exchange resin, and both ion exchange resins. Of these resins, the cation exchange resin is suitable.

Cation exchange resins formed by introducing a functional group such as a sulfonic acid group, a carboxyl group or the like into polyethylene, polystyrene, a fluoroplastic or the like are cited. A cation exchange resin formed by introducing a functional group such as a sulfonic acid group, a carboxyl group or the like into a fluoroplastic, in particular, is desirable. For example, Nafion (N-112) can be used.

The electrode films 2 are formed of carbon powder (carbon particles) and an ion conductive resin. In the electrode films 2, the carbon powder is dispersed into the ion conductive resin, and in that the carbon powder is bonded together via the ion conductive resin. The carbon powder is fine powder of carbon black having conductivity. The larger the specific surface area of the carbon powder, the larger the surface area of the carbon powder as electrode films 2 in contact with the ion conductive polymer film 1, so that a larger amount of deformation can be obtained. Ketjen black, for example, is desirable. The ion conductive resin may be the same as a material forming the ion conductive polymer film 1. Specifically, the ion conductive resin is formed by a coating of a paint obtained by mixing ketjen black (BET=800 $m^2/g$) and 5 wt % of a Nafion solution together at a solid content ratio of 1:3. Alternatively, gold or platinum may be directly reduced in a Nafion resin.

The electrode films 2 take such a constitution, and thereby have a proper degree of stiffness while having flexibility. In addition, because the electrode films 2 support the soft ion conductive polymer film 1 from both sides, the polymer actuator element 10 as a whole can have sufficient stiffness to support the optical element while having flexibility. Further, the polymer actuator element 10 as a whole has a spring characteristic similar to that of a leaf spring in a state in which no voltage is applied.

The electrode films 2 are formed by coating the ion conductive polymer film 1 with a paint including an ion conductive resin component and carbon powder. Alternatively, the electrode films 2 are formed by compression-bonding a conductive film made of carbon powder and an ion conductive resin to the ion conductive polymer film 1.

The electrode films 2 can be formed easily in a short time by either method.

Incidentally, the ion conductive polymer film 1 is at least impregnated with a cationic substance. The cationic substance is desirably water and metallic ions, water and organic ions, or an ionic liquid. The metallic ions include for example sodium ions, potassium ions, lithium ions, and magnesium ions. The organic ions include for example alkylammonium ions. These ions are present as hydrate in the ion conductive polymer film 1. When the ion conductive polymer film 1 includes water and metallic ions or water and organic ions, and is thus in a hydrous state, the polymer actuator element 10 is desirably sealed so that the water does not volatilize from the inside.

The ionic liquid is a solvent of only nonflammable and nonvolatile ions referred to also as room temperature molten salt. An ionic liquid of an imidazolium ring base compound, a pyridinium ring base compound, or an aliphatic base compound, for example, can be used. When the ion conductive polymer film 1 is impregnated with an ionic liquid, the polymer actuator element 10 can be used at a high temperature or in a vacuum without a fear of volatilization.

Figure 3:
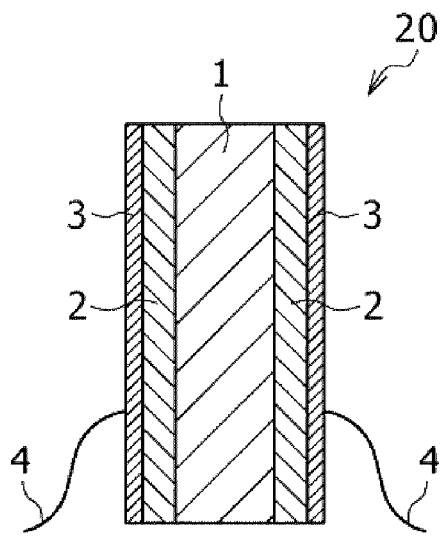
FIG. 3 is a sectional view of a constitution (2) of a polymer actuator element used according to an embodiment.

FIG. 3 shows an example of modification of the polymer actuator element.

FIG. 3 is a sectional view of a basic constitution of another polymer actuator element forming a polymer actuator element according to an embodiment.

The polymer actuator element 20 has metallic conductive films 3 of gold or platinum on the pair of electrode films 2, respectively, of the above-described polymer actuator element 10. Leads 4 are electrically connected to the metallic conductive films 3. In this case, an ion conductive polymer film 1, the electrode films 2, and a water base electrolytic solution with which the ion conductive polymer film 1 is impregnated are the same as in FIG. 2.

In this case, the metallic conductive films 3 are made by forming a thin film of gold or platinum on the pair of electrode films 2 by a hitherto known film formation method such as a wet plating method, a deposition method, a sputtering method or the like. While the thickness of the metallic conductive films 3 is not particularly limited, the metallic conductive films 3 desirably have such a thickness as to be continuous film so that a potential from the leads 4 is equally applied to the electrode films 2.

Figure 4A:
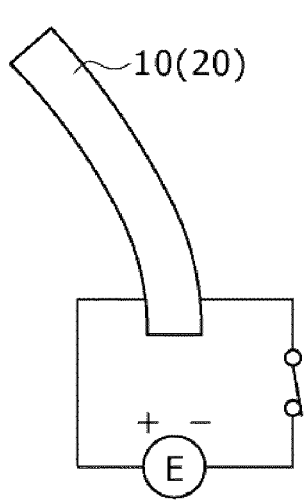
FIGS. 4A to 4C are diagrams of assistance in explaining operation of the polymer actuator elements according to an embodiment.
Figure 4B:
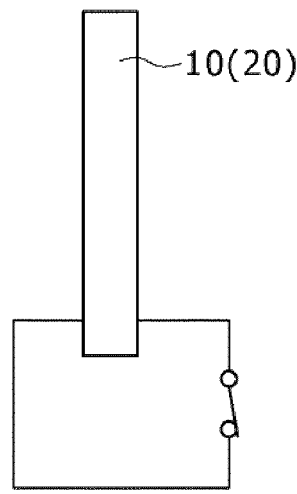
Figure 4C:
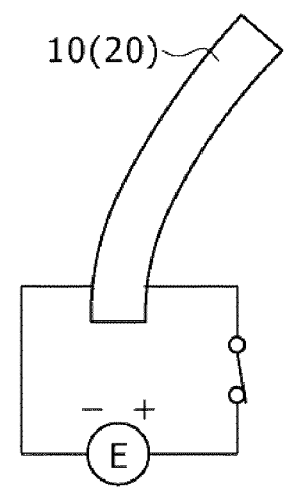

FIGS. 4A, 4B, and 4C represent principles of operation of the polymer actuator elements 10 and 20. Description in the following will be made supposing that the ion conductive polymer film 1 is impregnated with sodium ions.

In FIG. 4A, a positive potential is applied from a power source E to the electrode film 2 of the polymer actuator element 10 on a left side in the figure through the lead 4, and a negative potential is applied from the power source E to the electrode film 2 of the polymer actuator element 10 on a right side in the figure through the lead 4. A difference between the potentials (for example about 0.5 to 1.5 V) causes sodium ion hydrate in the ion conductive polymer film 1 of the polymer actuator element 10 (20) to be attracted and move to the electrode film 2 on the side where the negative potential is applied (right side in the figure), and concentrate in the vicinity of the electrode film 2, so that cubical expansion occurs in this region. On the other hand, the concentration of sodium hydrate in the vicinity of the electrode film 2 on the side where the positive potential is applied (left side in the figure) is decreased, so that cubical contraction occurs in this region. As a result, a difference in volume occurs between the regions of the ion conductive polymer film 1 in the vicinity of the two electrode films 2. The ion conductive polymer film 1 is thus bent to the left side in the figure. Incidentally, when a charge accumulated in the regions in the vicinity of the two electrode films 2 is retained without being moved after the ion conductive polymer film 1 is bent, the bent state is maintained without particular power being used.

In FIG. 4B, the two electrode films 2 are connected to each other in a short-circuited state, and thus a discharge occurs according to the charge accumulated in the regions in the vicinity of the two electrode films 2. As a result, a difference in potential between the two electrode films 2 disappears. Therefore a difference in volume between the regions of the ion conductive polymer film 1 in the vicinity of the two electrode films 2 disappears. The ion conductive polymer film 1 is thus set in the state of an initial shape (a straight state in this case).

In FIG. 4C, a negative potential is applied from the power source E to the electrode film 2 of the polymer actuator element 10 (20) on a left side in the figure through the lead 4, and a positive potential is applied from the power source E to the electrode film 2 of the polymer actuator element 10 (20) on a right side in the figure through the lead 4. A voltage applying method is opposite to that of FIG. 4A. This potential difference causes cubical expansion of a region on the side where the negative potential is applied (left side in the figure)

and cubical contraction of a region on the side where the positive potential is applied (right side in the figure) in the ion conductive polymer film 1 of the polymer actuator element 10 (20). As a result, the ion conductive polymer film 1 is bent to the right side in the figure.

An amount of displacement obtained by the bending of the polymer actuator element 10 as described above can be controlled by the applied voltage, and repeatability thereof is good.

Incidentally, supposing that the ion conductive polymer film 1 in the form of one oblong strip and the two electrode films 2 provided on both sides of the ion conductive polymer film 1 are one set, description so far has been made of the polymer actuator element 10 formed by the constitution of one set (unit polymer actuator). However, the polymer actuator element 10 is not limited to this. For example, the polymer actuator element 10 may be formed by laminating, in a direction of thickness, a plurality of sets of unit polymer actuators smaller in thickness than the unit polymer actuator used as the polymer actuator element 10 of the above-described one-set configuration. In this case, although the thickness of the whole of the polymer actuator element 10 is the same as the thickness of the polymer actuator element 10 of the above-described one-set configuration (for example 300 to 500 μm), the polymer actuator element 10 responds to voltage application more quickly and has higher output torque than the polymer actuator element 10 of the above-described one-set configuration.

In addition, while description has been made supposing that the polymer actuator elements 10a, 10b, 10c, and 10d are in the shape of an oblong strip, the shape of the polymer actuator elements 10a, 10b, 10c, and 10d is not particularly limited as long as the polymer actuator elements 10a, 10b, 10c, and 10d have a certain length, and a displacement (bend) due to voltage application of one end part in the direction of length with respect to the other end part can be transmitted to an object (optical element 11). Specifically, for example, a principal plane may be a triangle, an oval, or an indeterminate shape partially cut so as not to be in contact with another peripheral part.

FIGS. 5A, 5B, and 5C show states of driving of the optical element module 100.

The optical element module 100 can bend one or both of the polymer actuator elements 10a and 10b by applying voltage to one or both of the polymer actuator elements 10a and 10b, and move the optical element 11 in one direction of the X-direction by the pushing of one end part of the polymer actuator elements 10a and 10b (contact P). In addition, the optical element module 100 can bend one or both of the polymer actuator elements 10c and 10d by applying voltage to one or both of the polymer actuator elements 10c and 10d, and move the inner frame 12 and the optical element 11 in one direction of the Y-direction by the pushing of one end part of the polymer actuator elements 10c and 10d (contact P). Specifically, the optical element module 100 can bend the polymer actuator element 10a and move the optical element 11 in one direction (right direction or an X(+) direction in FIG. 5A) of the X-direction by the pushing of one end part of the polymer actuator element 10a (contact P) (operation 1 (FIG. 5B)), and bend the polymer actuator element 10b and move the optical element 11 in one direction (left direction or an X(−) direction in FIG. 5A) of the X-direction by the pushing of one end part of the polymer actuator element 10b (contact P) (operation 2 (FIG. 5C)). In addition, the optical element module 100 can bend the polymer actuator element 10d and move the inner frame 12 and the optical element 11 in one direction (upward direction or a Y(+) direction in FIG. 5A) of the Y-direction by the pushing of one end part of the polymer actuator element 10d (contact P) (operation 3 (FIG. 5D)), and bend the polymer actuator element 10c and move the inner frame 12 and the optical element 11 in one direction (downward direction or a Y(−) direction in FIG. 5A) of the Y-direction by the pushing of one end part of the polymer actuator element 10c (contact P) (operation 4 (FIG. 5E)).

In actual driving, by combining the above-described operation 1 to 4 as appropriate (a single operation of one of the operation 1 to 4 or a combined operation of the operation 1 or 2 and the operation 3 or 4), the optical element 11 can be moved to an arbitrary position on the XY plane perpendicular to the direction of the optical axis of the optical element 11 in a range of a few hundred μm.

Incidentally, the polymer actuator element opposed to the bending polymer actuator element (for example the polymer actuator element 10b in the operation 1, the polymer actuator element 10a in the operation 2, the polymer actuator element 10c in the operation 3, and the polymer actuator element 10d in the operation 4) is not applied with voltage, and is in a state as of a leaf spring. Therefore, the polymer actuator element is deformed in the direction of the movement of the optical element 11 due to the bend while suppressing play during the movement by holding the object (the optical element 11 and the inner frame 12) by the contact P of the polymer actuator element.

In addition, one of the polymer actuator elements 10a and 10b may be a leaf spring in the shape of an oblong strip which leaf spring has a spring characteristic similar to that of these polymer actuator elements, and one of the polymer actuator elements 10c and 10d may be a leaf spring in the shape of an oblong strip which leaf spring has a spring characteristic similar to that of these polymer actuator elements.

Description will next be made of a second embodiment of an optical element module according to the an embodiment.

Figure 6:
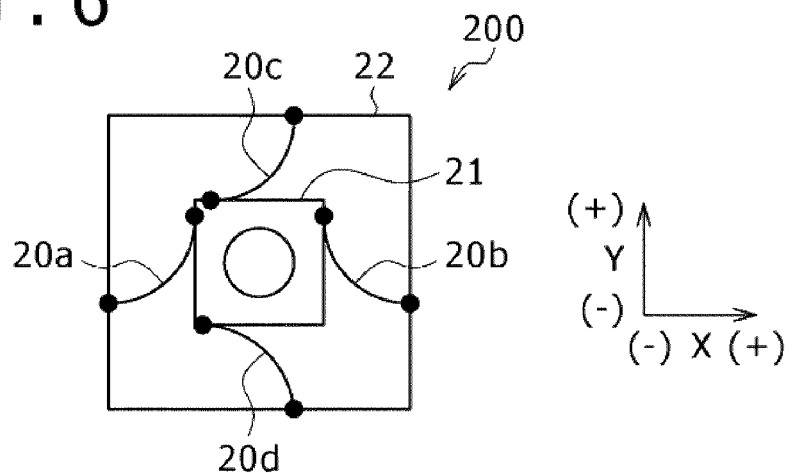
FIG. 6 is a schematic diagram showing a constitution of a second embodiment of an optical element module according to an embodiment.

FIG. 6 is a schematic diagram showing a constitution of a second embodiment of an optical element module according to an embodiment, and is a diagram of an optical element module 200 as viewed from above along an optical axis.

The optical element module 200 includes an optical element 21 and four polymer actuator elements 20a, 20b, 20c, and 20d bent at 90° to 180° (90° in FIG. 6) in a direction of thickness as an initial shape and supporting the optical element 21, another end part of the polymer actuator elements 20a, 20b, 20c, and 20d being fixed to a fixing frame 22, and one end part of the polymer actuator elements 20a, 20b, 20c, and 20d being fixed to the optical element 21.

The optical element 21 in this case is a lens and a lens holder, or an image pickup element such as a CCD or the like. FIG. 6 shows the optical element 21 formed by a lens and a lens holder. The other end part of each of the polymer actuator elements 20a, 20b, 20c, and 20d is fixed to the fixing frame 22. The fixing frame 22 has sufficient stiffness to support at least the polymer actuator elements 20a, 20b, 20c, and 20d and the optical element 21.

The four polymer actuator elements 20a, 20b, 20c, and 20d are oblong strip-shaped actuator elements having the same constitution as the above-described polymer actuator element 10. However, the four polymer actuator elements 20a, 20b, 20c, and 20d are each formed in a state of being bent at a same angle in the direction of thickness as an initial shape. The angle can be selected arbitrarily in a range of 90° to 180°. The two polymer actuator elements 20a and 20b are actuator elements A arranged such that the principal planes of the polymer actuator elements 20a and 20b are opposed to each other with the optical element 21 interposed between the polymer actuator elements 20a and 20b in an X-direction and such that the bend shapes of the polymer actuator elements 20a and 20b are axisymmetric with respect to a Y-axis, one end part of each of the actuator elements A being fixed to the optical element 21, and another end part of the actuator elements A being fixed to the fixing frame 22. Incidentally, by bending the polymer actuator elements 20a and 20b by voltage application, the one end part of both the polymer actuator elements 20a and 20b is displaced on an X-axis without being displaced in the direction of the Y-axis. The other two polymer actuator elements 20c and 20d are actuator elements B arranged such that the principal planes of the polymer actuator elements 20c and 20d are opposed to each other with the optical element 21 interposed between the polymer actuator elements 20c and 20d in a Y-direction and such that the bend shapes of the polymer actuator elements 20c and 20d are axisymmetric with respect to the X-axis, one end part of each of the actuator elements B being fixed to the optical element 21, and another end part of the actuator elements B being fixed to the fixing frame 22. Incidentally, by bending the polymer actuator elements 20c and 20d by voltage application, the one end part of both the polymer actuator elements 20c and 20d is displaced on the Y-axis without being displaced in the direction of the X-axis.

Incidentally, while description has been made supposing that the polymer actuator elements 20a, 20b, 20c, and 20d are in the shape of an oblong strip, the shape of the polymer actuator elements 20a, 20b, 20c, and 20d is not particularly limited as long as the polymer actuator elements 20a, 20b, 20c, and 20d have a certain length, and a displacement (bend) due to voltage application of one end part in the direction of length with respect to the other end part can be transmitted to the object (the optical element 21). Specifically, for example, a principal plane may be a triangle, an oval, or an indeterminate shape partially cut so as not to be in contact with another peripheral part.

In the optical element module 200 assembled as the above-described constitution, the polymer actuator elements 20a, 20b, 20c, and 20d to which no voltage is applied are in a state as of a leaf spring. Thus, the polymer actuator elements 20a, 20b, 20c, and 20d to which no voltage is applied are in an initial state shown in FIG. 6, that is, the optical element 21 is retained so as to be positioned at the center of the optical element module 200.

Figure 7B:
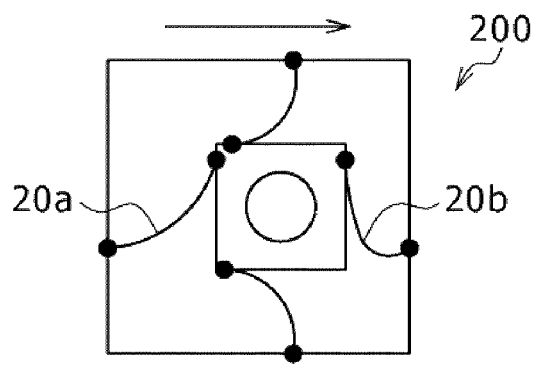
FIGS. 7A to 7C are top views showing states of driving of the optical element module of FIG. 6.
Figure 7A:
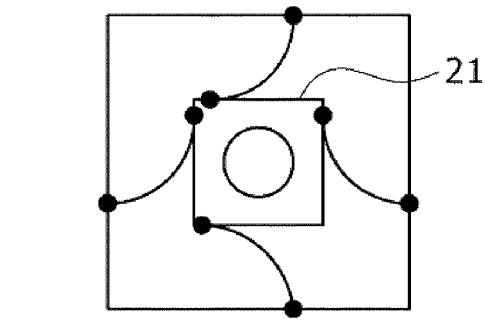
Figure 7C:
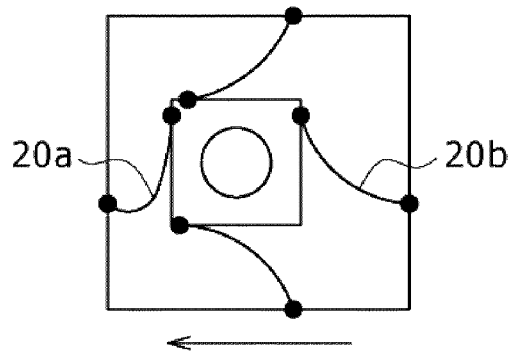

FIGS. 7A, 7B, and 7C show states of driving of the optical element module 200.

The optical element module 200 can bend one or both of the polymer actuator elements 20a and 20b by applying voltage to one or both of the polymer actuator elements 20a and 20b, and move the optical element 21 in one direction of the X-direction by the pushing or pulling of one end part of the polymer actuator elements 20a and 20b. In addition, the optical element module 200 can bend one or both of the polymer actuator elements 20c and 20d by applying voltage to one or both of the polymer actuator elements 20c and 20d, and move the optical element 21 in one direction of the Y-direction by the pushing or pulling of one end part of the polymer actuator elements 20c and 20d.

Specifically, the operation of moving the optical element 21 in the X-direction is performed as follows.

(1) Operation 1 (FIG. 7B)

One or both of the following operations 1a and 1b are performed to move the optical element 21 in an X(+) direction (right direction in FIG. 6).

(Operation 1a) The polymer actuator element 20a is bent so as to decrease the curvature of the polymer actuator element 20a by applying voltage, so that one end part of the polymer actuator element 20a pushes the optical element 21.

(Operation 1b) The polymer actuator element 20b is bent so as to increase the curvature of the polymer actuator element 20b by applying voltage, so that one end part of the polymer actuator element 20b pulls the optical element 21.

(2) Operation 2 (FIG. 7C)

One or both of the following operations 2a and 2b are performed to move the optical element 21 in an X(−) direction (left direction in FIG. 6).

(Operation 2a) The polymer actuator element 20b is bent so as to decrease the curvature of the polymer actuator element 20b by applying voltage, so that one end part of the polymer actuator element 20b pushes the optical element 21.

(Operation 2b) The polymer actuator element 20a is bent so as to increase the curvature of the polymer actuator element 20a by applying voltage, so that one end part of the polymer actuator element 20a pulls the optical element 21.

The operation of moving the optical element 21 in the Y-direction is performed as follows.

(3) Operation 3

One or both of the following operations 3a and 3b are performed to move the optical element 21 in a Y(+) direction (upward direction in FIG. 6).

(Operation 3a) The polymer actuator element 20d is bent so as to decrease the curvature of the polymer actuator element 20d by applying voltage, so that one end part of the polymer actuator element 20d pushes the optical element 21.

(Operation 3b) The polymer actuator element 20c is bent so as to increase the curvature of the polymer actuator element 20c by applying voltage, so that one end part of the polymer actuator element 20c pulls the optical element 21.

(4) Operation 4

One or both of the following operations 4a and 4b are performed to move the optical element 21 in a Y(−) direction (downward direction in FIG. 6).

(Operation 4a) The polymer actuator element 20c is bent so as to decrease the curvature of the polymer actuator element 20c by applying voltage, so that one end part of the polymer actuator element 20c pushes the optical element 21.

(Operation 4b) The polymer actuator element 20d is bent so as to increase the curvature of the polymer actuator element 20d by applying voltage, so that one end part of the polymer actuator element 20d pulls the optical element 21.

In actual driving, by combining the above-described operation 1 to 4 as appropriate (a single operation of one of the operation 1 to 4 or a combined operation of the operation 1 or 2 and the operation 3 or 4), the optical element 21 can be moved to an arbitrary position on the XY plane perpendicular to the direction of the optical axis of the optical element 21 in a range of a few hundred μm.

Incidentally, when no voltage is applied to the polymer actuator element opposed to the bending polymer actuator element (for example the polymer actuator element 20b when the operation 2 is performed by the operation 1a alone, the polymer actuator element 20a when the operation 2 is performed by the operation 2a alone, the polymer actuator element 20c when the operation 3 is performed by the operation 3a alone, and the polymer actuator element 20d when the operation 4 is performed by the operation 4a alone), the polymer actuator element to which no voltage is applied is in a state as of a leaf spring. Therefore, the polymer actuator element is deformed in the direction of the movement of the optical element 21 due to the bend while suppressing play during the movement by holding the object (the optical element 21) by one end part of the polymer actuator element.

In addition, one of the polymer actuator elements 20a and 20b may be a leaf spring in the shape of an oblong strip which leaf spring has a spring characteristic similar to that of these polymer actuator elements, and one of the polymer actuator elements 20c and 20d may be a leaf spring in the shape of an oblong strip which leaf spring has a spring characteristic similar to that of these polymer actuator elements.

In addition, one or two of the four polymer actuator elements 20a, 20b, 20c, and 20d may be omitted. For example, it is possible to remove the polymer actuator element 20d in FIG. 6, arrange the three polymer actuator elements 20a, 20b, and 20c as described above, and move the optical element 21 by driving each of the polymer actuator elements 20a, 20b, and 20c as described above. Alternatively, it is possible to remove the polymer actuator elements 20b and 20d in FIG. 6, arrange the two polymer actuator elements 20a and 20c as described above, and move the optical element 21 by driving each of the polymer actuator elements 20a and 20c as described above.

Description will next be made of a third embodiment of an optical element module according to an embodiment.

Figure 8:
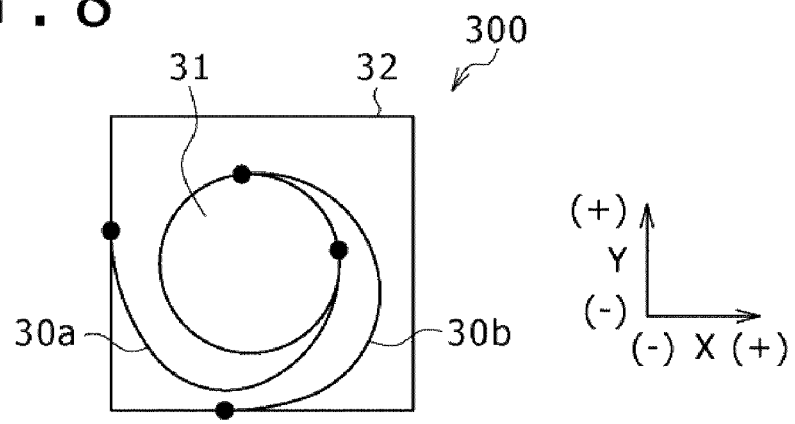
FIG. 8 is a schematic diagram showing a constitution of a third embodiment of an optical element module.

FIG. 8 is a schematic diagram showing a constitution of a third embodiment of an optical element module according to an embodiment, and is a diagram of an optical element module 300 as viewed from above along an optical axis.

The optical element module 300 includes an optical element 31 and two polymer actuator elements 30a and 30b bent at 180° in a direction of thickness as an initial shape and supporting the optical element 31, another end part of the polymer actuator elements 30a and 30b being fixed to a fixing frame 32, and one end part of the polymer actuator elements 30a and 30b being fixed to the optical element 31.

The optical element 31 in this case is a lens, a lens and a lens holder, or an image pickup element such as a CCD or the like. FIG. 8 shows the optical element 31 formed by a single lens. The other end part of each of the polymer actuator elements 30a and 30b is fixed to the fixing frame 32. The fixing frame 32 has sufficient stiffness to support at least the polymer actuator elements 30a and 30b and the optical element 31.

The two polymer actuator elements 30a and 30b are oblong strip-shaped actuator elements having the same constitution as the above-described polymer actuator element 10. However, the two polymer actuator elements 30a and 30b are each formed in a state of being bent at 180° in the direction of thickness as an initial shape. The bend angle does not need to be precisely 180°, and it suffices for the bend angle to be in a range in which the motion of the other polymer actuator element is not obstructed. The angle can be selected arbitrarily in a range of 100° to 260°. The polymer actuator element 30a is an actuator element A having the optical element 31 interposed between both end parts of the actuator element A which end parts are arranged in an X-direction, one end part of the actuator element A being fixed to the optical element 31, and another end part of the actuator element A being fixed to the fixing frame 32. Incidentally, by bending the polymer actuator element 30a by voltage application, the one end part of the polymer actuator element 30a is displaced on an X-axis without being displaced in the direction of a Y-axis. The polymer actuator element 30b is an actuator element B having the optical element 31 interposed between both end parts of the actuator element B which end parts are arranged in a Y-direction, one end part of the actuator element B being fixed to the optical element 31, and another end part of the actuator element B being fixed to the fixing frame 32. Incidentally, by bending the polymer actuator element 30b by voltage application, the one end part of the polymer actuator element 30b is displaced on the Y-axis without being displaced in the direction of the X-axis. With this constitution, a distance between the optical element 31 and the inner wall of the fixing frame 32 at a position where most space is necessary is a sum of the thickness of the two polymer actuator elements 30a and 30b and displacement spaces of each of the polymer actuator elements 30a and 30b, and is about 1.5 to 2 mm, for example.

Incidentally, while description has been made supposing that the polymer actuator elements 30a and 30b are in the shape of an oblong strip, the shape of the polymer actuator elements 30a and 30b is not particularly limited as long as the polymer actuator elements 30a and 30b have a certain length, and a displacement (bend) due to voltage application of one end part in the direction of length with respect to the other end part can be transmitted to the object (the optical element 31). Specifically, for example, a principal plane may be a triangle, an oval, or an indeterminate shape partially cut so as not to be in contact with another peripheral part.

In the optical element module 300 assembled as the above-described constitution, the polymer actuator elements 30a and 30b to which no voltage is applied are in a state as of a leaf spring. Thus, the polymer actuator elements 30a and 30b to which no voltage is applied are in an initial state shown in FIG. 8, that is, the optical element 31 is retained so as to be positioned at the center of the optical element module 300.

Figure 9B:
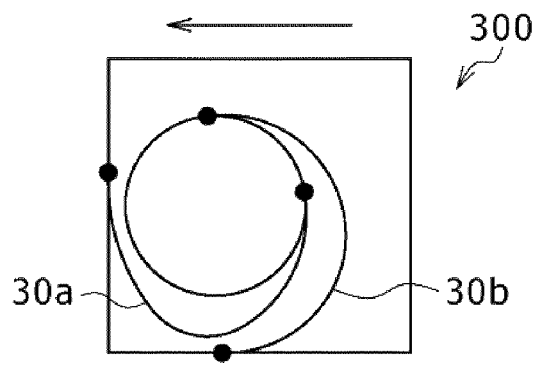
FIGS. 9A to 9C are top views showing states of driving of the optical element module of FIG. 8.
Figure 9A:
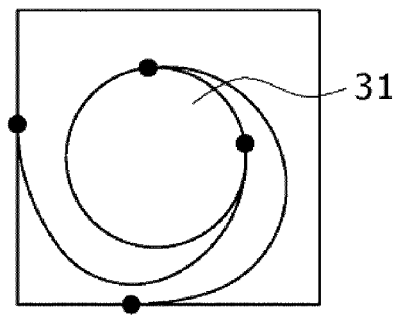
Figure 9C:
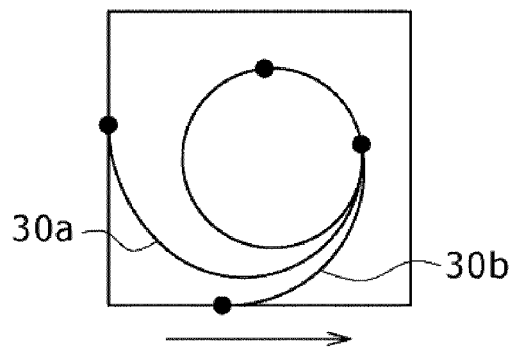

FIGS. 9A, 9B, and 9C show states of driving of the optical element module 300.

The optical element module 300 can bend the polymer actuator element 30a by applying voltage to the polymer actuator element 30a, and move the optical element 31 in one direction of the X-direction by the pushing or pulling of one end part of the polymer actuator element 30a. In addition, the optical element module 300 can bend the polymer actuator element 30b by applying voltage to the polymer actuator element 30b, and move the optical element 31 in one direction of the Y-direction by the pushing or pulling of one end part of the polymer actuator element 30b.

Specifically, the operation of moving the optical element 31 in the X-direction is performed as follows.

(1) Operation 1 (FIG. 9C)

The following operation 2 is performed to move the optical element 31 in an X(+) direction (right direction in FIG. 8).

(Operation 1) The polymer actuator element 30a is bent so as to decrease the curvature of the polymer actuator element 30a by applying voltage, so that one end part of the polymer actuator element 30a pulls the optical element 31.

(2) Operation 2 (FIG. 9B)

The following operation 2 is performed to move the optical element 31 in an X(−) direction (left direction in FIG. 8).

(Operation 2) The polymer actuator element 30a is bent so as to increase the curvature of the polymer actuator element 30a by applying voltage, so that one end part of the polymer actuator element 30a pushes the optical element 31.

The operation of moving the optical element 31 in the Y-direction is performed as follows.

(3) Operation 3

The following operation 3 is performed to move the optical element 31 in a Y(+) direction (upward direction in FIG. 8).

(Operation 3) The polymer actuator element 30b is bent so as to decrease the curvature of the polymer actuator element 30b by applying voltage, so that one end part of the polymer actuator element 30b pulls the optical element 31.

(4) Operation 4

The following operation 4 is performed to move the optical element 31 in a Y(−) direction (downward direction in FIG. 8).

(Operation 4) The polymer actuator element 30b is bent so as to increase the curvature of the polymer actuator element

30b by applying voltage, so that one end part of the polymer actuator element 30b pushes the optical element 31.

In actual driving, by combining the above-described operation 1 to as appropriate (a single operation of one of the operation 1 to 4 or a combined operation of the operation 1 or 2 and the operation 3 or 4), the optical element 31 can be moved to an arbitrary position on the XY plane perpendicular to the direction of the optical axis of the optical element 31 in a range of a few hundred μm.

Incidentally, one or two polymer actuator elements may be further added to the two polymer actuator elements 30a and 30b described above. For example, a polymer actuator element having the same shape as the polymer actuator element 30a in FIG. 8 may be added by being disposed after being rotated by 90° to the right from the position of the polymer actuator element 30a with the center of the optical element 31 as a central point. Alternatively, a polymer actuator element having the same shape as the polymer actuator element 30a in FIG. 8 may be further added by being disposed after being rotated by 180° to the right from the position of the polymer actuator element 30a with the center of the optical element 31 as a central point. As for driving in this case, two polymer actuator elements in opposed relation to each other with the optical element 31 interposed between the two polymer actuator elements are set as one set, and each set is subjected to bend control so as to be involved in movement in the X-direction or the Y-direction.

Description will next be made of a fourth embodiment of an optical element module.

Figure 10:
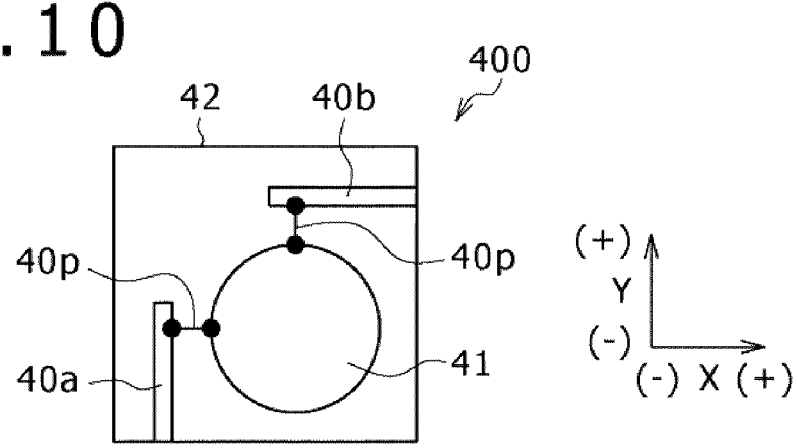
FIG. 10 is a schematic diagram showing a constitution of a fourth embodiment of an optical element module.

FIG. 10 is a schematic diagram showing a constitution of a fourth embodiment of an optical element module, and is a diagram of an optical element module 400 as viewed from above along an optical axis.

The optical element module 400 includes an optical element 41 and two polymer actuator elements 40a and 40b in the shape of an oblong strip that is straight in a direction of length as an initial shape, another end part of the polymer actuator elements 40a and 40b being connected to a fixing frame 42, and one end part of the polymer actuator elements 40a and 40b being coupled to an optical element 41 via an arm member 40p such that a displacement of the one end part can be transmitted to the optical element 41.

The optical element 41 in this case is a lens, a lens and a lens holder, or an image pickup element such as a CCD or the like. FIG. 10 shows the optical element 41 formed by a single lens. The other end part of each of the polymer actuator elements 40a and 40b is fixed to the fixing frame 42. The fixing frame 42 has sufficient stiffness to support at least the polymer actuator elements 40a and 40b and the optical element 41.

The two polymer actuator elements 40a and 40b are oblong strip-shaped actuator elements having the same constitution as the above-described polymer actuator element 10. The polymer actuator element 40a is disposed as an actuator element A in a state of being upright on an inner surface of the fixing frame 42 which inner surface extends in an X-direction. The other end part of the polymer actuator element 40a is fixed to the fixing frame 42. A junction part of one end part of the polymer actuator element 40a and the arm member 40p and a junction part of the arm member 40p and the optical element 41 have a structure allowing either one to be freely rotatable with respect to the other. The polymer actuator element 40b is disposed as an actuator element B in a state of being upright on an inner surface of the fixing frame 42 which inner surface extends in a Y-direction. The other end part of the polymer actuator element 40b is fixed to the fixing frame 42. A junction part of one end part of the polymer actuator element 40b and the arm member 40p and a junction part of the arm member 40p and the optical element 41 have a structure allowing either one to be freely rotatable with respect to the other. It is desirable that as the structures allowing either one to be freely rotatable with respect to the other, a universal joint be used at the junction parts, for example, or that the arm members 40p be a ball point arm structure. Alternatively, the junction parts may be formed via a flexible leaf spring or a plastic film.

Incidentally, while description has been made supposing that the polymer actuator elements 40a and 40b are in the shape of an oblong strip, the shape of the polymer actuator elements 40a and 40b is not particularly limited as long as the polymer actuator elements 40a and 40b have a certain length, and a displacement (bend) due to voltage application of one end part in the direction of length with respect to the other end part can be transmitted to the object (the optical element 41) via the arm member 40p. Specifically, for example, a principal plane may be a triangle, an oval, or an indeterminate shape partially cut so as not to be in contact with another peripheral part.

In the optical element module 400 assembled as the above-described constitution, the polymer actuator elements 40a and 40b to which no voltage is applied are in a state as of a leaf spring. Thus, the polymer actuator elements 40a and 40b to which no voltage is applied are in an initial state shown in FIG. 10, that is, the optical element 41 is retained at an arbitrary position of the optical element module 400.

Figure 11B:
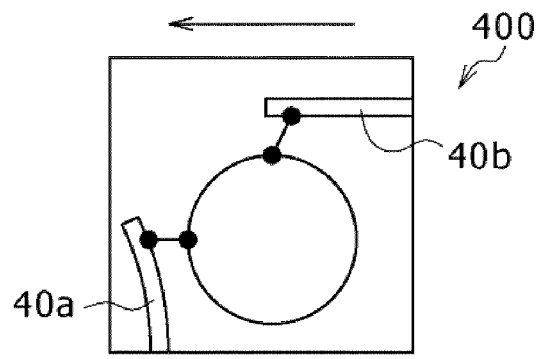
FIGS. 11A to 11C are top views showing states of driving of the optical element module of FIG. 10.
Figure 11A:
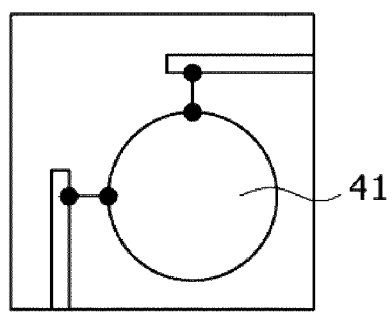
Figure 11C:
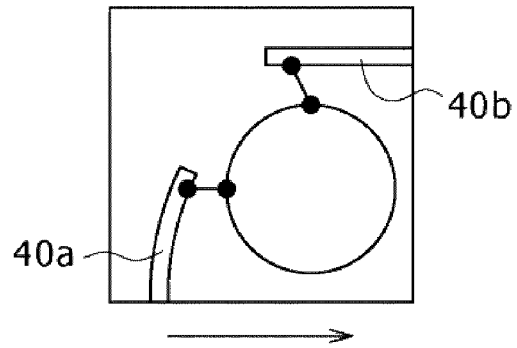

FIGS. 11A, 11B, and 11C show states of driving of the optical element module 400.

The optical element module 400 can bend the polymer actuator element 40a by applying voltage to the polymer actuator element 40a, and move the optical element 41 in one direction of the X-direction by the pushing or pulling of one end part of the polymer actuator element 40a. In addition, the optical element module 400 can bend the polymer actuator element 40b by applying voltage to the polymer actuator element 40b, and move the optical element 41 in one direction of the Y-direction by the pushing or pulling of one end part of the polymer actuator element 40b.

Specifically, the operation of moving the optical element 41 in the X-direction is performed as follows.

(1) Operation 1 (FIG. 11C)

The following operation 2 is performed to move the optical element 41 in an X(+) direction (right direction in FIG. 10).

(Operation 1) The polymer actuator element 40a is bent to the optical element 41 side by applying voltage, so that the arm member 40p joined to one end part of the polymer actuator element 40a pushes the optical element 41.

(2) Operation 2 (FIG. 11B)

The following operation 2 is performed to move the optical element 41 in an X(−) direction (left direction in FIG. 10).

(Operation 2) The polymer actuator element 40a is bent to a side opposite from the optical element 41 by applying voltage, so that the arm member 40p joined to one end part of the polymer actuator element 40a pulls the optical element 41.

The operation of moving the optical element 41 in the Y-direction is performed as follows.

(3) Operation 3

The following operation 3 is performed to move the optical element 41 in a Y(+) direction (upward direction in FIG. 10).

(Operation 3) The polymer actuator element 40b is bent to a side opposite from the optical element 41 by applying voltage, so that the arm member 40p joined to one end part of the polymer actuator element 40b pulls the optical element 41.

(4) Operation 4

The following operation 4 is performed to move the optical element 41 in a Y(−) direction (downward direction in FIG. 10).

(Operation 4) The polymer actuator element 40b is bent to the optical element 41 side by applying voltage, so that the arm member 40p joined to one end part of the polymer actuator element 40b pushes the optical element 41.

In actual driving, by combining the above-described operation 1 to 4 as appropriate (a single operation of one of the operation 1 to 4 or a combined operation of the operation 1 or 2 and the operation 3 or 4), the optical element 41 can be moved to an arbitrary position on an XY plane perpendicular to the direction of the optical axis of the optical element 41 in a range of a few hundred μm.

Description will next be made of a configuration of an image pickup device according to an embodiment.

Figure 12:
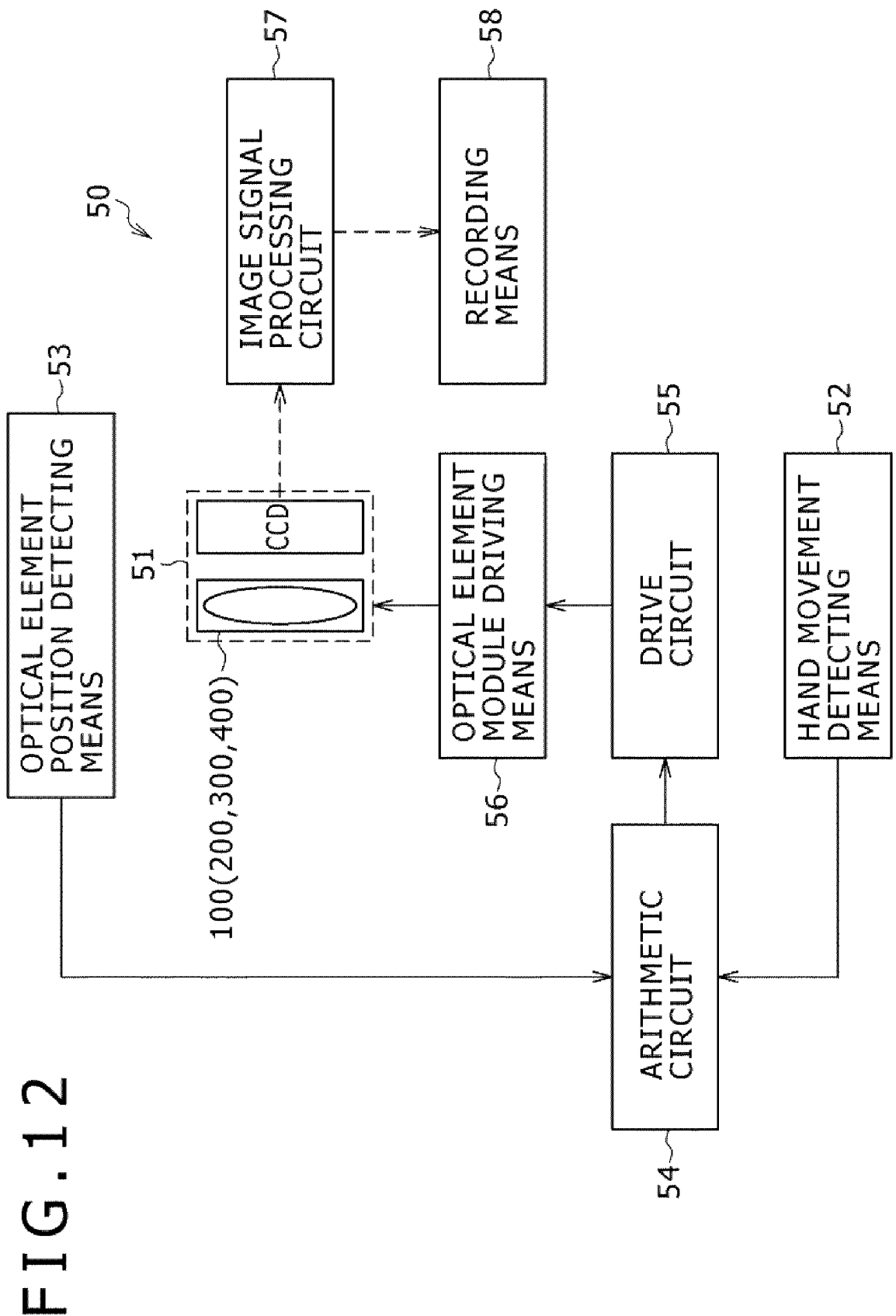
FIG. 12 is a block diagram showing a configuration of an image pickup device according to an embodiment.

FIG. 12 is a block diagram showing a configuration of an image pickup device according to an embodiment, centering on a hand movement correcting function.

As shown in FIG. 12, the image pickup device 50 includes: an image pickup optical system 51 formed by an optical element group of a plurality of lenses and an image pickup element CCD, a part of the image pickup optical system 51 being the optical element module 100 according to one embodiment; hand movement detecting means 52 such as an acceleration sensor or the like; optical element position detecting means 53 for detecting the position of the optical element forming the optical element module 100; an arithmetic circuit 54 for receiving a signal from the hand movement detecting means 52 and the optical element position detecting means 53 and performing arithmetic processing; a drive circuit 55 for receiving a signal from the arithmetic circuit 54; optical element module driving means 56 for receiving a signal from the drive circuit 55 and controlling the driving of the optical element module 100; an image signal processing circuit 57 for subjecting an image signal output from the image pickup element CCD to image signal processing such as white balance correction, γ correction and the like; and recording means 58 for storing data resulting from the signal processing. Incidentally, one of the optical element modules 200, 300, and 400 according to the foregoing embodiments may be substituted for the optical element module 100 of the image pickup optical system 51.

In the image pickup device 50, when photographing is started by pressing a shutter button or the like, an image signal resulting from image formation is output from the image pickup element CCD of the image pickup optical system 51. The image signal processing circuit 57 then subjects the image signal to image signal processing such as white balance correction, γ correction and the like. The recording means 58 stores data after the image signal processing.

Figure 13:
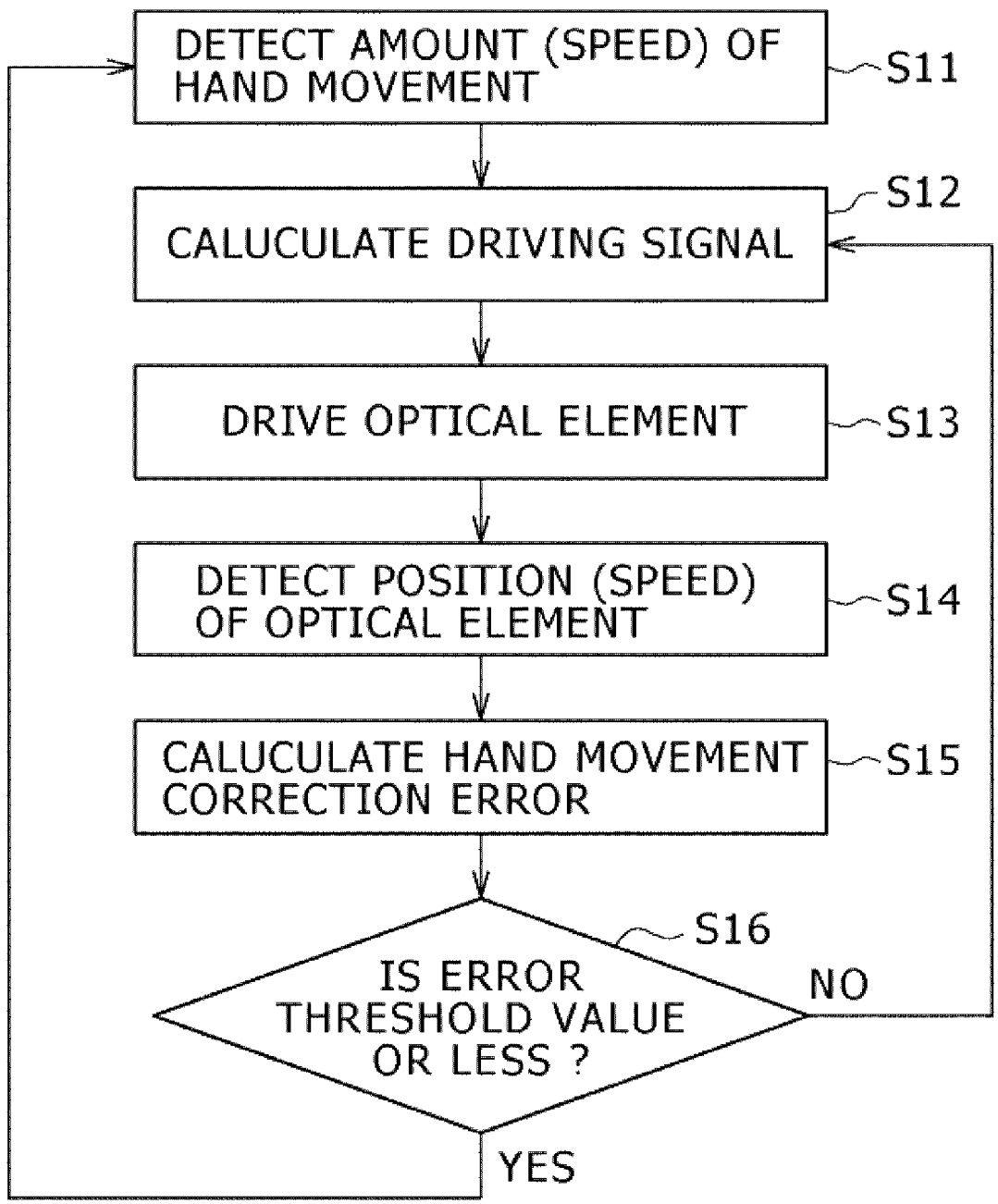
FIG. 13 is a flowchart of a hand movement correcting operation in the image pickup device of FIG. 12.

FIG. 13 represents an operation procedure of a hand movement correcting mechanism at a time of photographing in the image pickup device 50. Description in the following will be made supposing that a hand movement occurs at an instant of pressing the shutter button in the image pickup device 50.

(S11) At the instant of pressing the shutter button, the hand movement detecting means 52 detects the movement of the image pickup device 50 as a whole. Next, the arithmetic circuit 54 calculates an amount (or speed) of hand movement on the basis of a detection signal from the hand movement detecting means 52.

(S12) Next, the arithmetic circuit 54 calculates a target position for the optical element 11 of the optical element module 100 so as to cancel image movement that occurs depending on the amount (or speed) of hand movement. The arithmetic circuit 54 further calculates and outputs a driving signal according to a result of calculation of the amount of movement.

(S13) The drive circuit 55 controls the optical element module driving means 56 on the basis of the driving signal from the arithmetic circuit 54. Further, the optical element module driving means 56 under the control of the drive circuit 55 applies predetermined voltages to the respective actuator elements 10a, 10b, 10c, and 10d of the optical element module 100 to bend and displace the actuator elements 10a, 10b, 10c, and 10d. The optical element module driving means 56 thereby drives the optical element module 100 so that the optical element 11 is moved on the XY plane perpendicular to the optical axis of the optical element 11.

(S14) At this time, the optical element position detecting means 53 detects the position (or speed) of the optical element 11.

(S15) On the basis of a detection signal of the optical element position detecting means 53, the arithmetic circuit 54 calculates an error (hand movement correction error) from the target position for the optical element 11 which target position is obtained in step S12.

(S16) Next, when the hand movement correction error is equal to or less than a preset threshold value (YES), hand movement correcting operation at this time is ended, and preparation is made for a next hand movement correcting operation (to step S11). When the hand movement correction error exceeds the preset threshold value (NO), a return is made to step S12 to perform process operation from step S12 on down.

As a result of the above hand movement correcting operation, the optical element 11 in the optical element module 100 is accurately driven to the target position. Thus proper image pickup is made possible.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element module comprising:
an optical element; and
a plurality of actuator elements each having an ion conductive polymer film in an oblong strip shape and electrodes disposed on both sides of said ion conductive polymer film, said actuator elements as a whole bending in a direction of thickness by applying a voltage between said electrodes;
said optical element being moved on a plane perpendicular to an optical axis of said optical element by the bending of said actuator elements;
wherein said plurality of actuator elements are arranged such that a direction of width of the oblong strip shape of said plurality of actuator elements is a direction of said optical axis and such that a direction of thickness of said plurality of actuator elements is perpendicular to said optical axis , another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending, wherein the optical element module further includes:

an inner frame for containing said optical element such that said optical element is movable in an X-direction; and an outer frame for containing said inner frame together with the optical element such that said inner frame together with the optical element is movable in a Y-direction;

wherein said plurality of actuator elements include two actuator elements A whose principal planes are opposed to each other with said optical element interposed between said two actuator elements A in the X-direction, said one end part of each of said two actuator elements A being in contact with said optical element, and said other end part of each of said two actuator elements A being fixed to said inner frame, and two actuator elements B whose principal planes are opposed to each other with said inner frame interposed between said two actuator elements B in the Y-direction, said one end part of each of said two actuator elements B being in contact with said inner frame, and said other end part of each of said two actuator elements B being fixed to said outer frame, said optical element is moved in one direction of the X-direction by pushing due to said bending of one actuator element A of said two actuator elements A, and said inner frame and said optical element are moved in one direction of the Y-direction by pushing due to said bending of one actuator element B of said two actuator elements B.

2. The optical element module according to claim 1, wherein said optical element is one of a lens, a lens and a lens holder, and an image pickup element.

3. The optical element module according to claim 1, wherein said electrodes are a conductive film formed by dispersing carbon particles into a resin.

4. The optical element module according to claim 1, wherein each of said actuator elements is formed by laminating, in the direction of the thickness, a plurality of actuator elements each having electrodes on both sides of an ion conductive polymer film in a shape of an oblong strip.

5. The optical element module according to claim 1, wherein one of said two actuator elements A is a leaf spring in a shape of an oblong strip in place of said actuator element.

6. The optical element module according to claim 1, wherein one of said two actuator elements B is a leaf spring in a shape of an oblong strip in place of said actuator element.

7. An optical element module comprising:
an optical element; and
a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending, wherein said optical element is supported by four actuator elements bent at 90° to 180° in a direction of thickness as an initial shape, said other end part of the actuator elements being fixed to a fixing frame, and said one end part of the actuator elements being fixed to said optical element, two actuator elements of said four actuator elements are arranged as actuator elements A whose principal planes are opposed to each other with said optical element interposed between the actuator elements A in an X-direction, and said optical element is moved in one direction of the X-direction by one of pushing and pulling of one end part of at least one actuator element A due to the bending by applying said voltage, and the other two actuator elements are arranged as actuator elements B whose principal planes are opposed to each other with said optical element interposed between the actuator elements B in a Y-direction, and said optical element is moved in one direction of the Y-direction by one of pushing and pulling of one end part of at least one actuator element B due to the bending by applying said voltage.

8. An optical element module comprising:
an optical element; and
a plurality of actuator elements each having an ion conductive polymer film in an oblong strip shape and electrodes disposed on both sides of said ion conductive polymer, film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis , another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending, wherein said optical element is supported by two actuator elements bent at 180° in a direction of thickness as an initial shape, said other end part of said actuator elements being fixed to a fixing frame, and said one end part of said actuator elements being fixed to said optical element, one actuator element of said two actuator elements is arranged as an actuator element A with said optical element interposed between both end parts of the actuator element A, both end parts of the actuator element A being arranged in an X-direction, and said optical element is moved in one direction of the X-direction by one of pushing and pulling of one end part of the actuator element A due to the bending by applying said voltage, and the other actuator element is arranged as an actuator element B with said optical element interposed between both end parts of the actuator element B, both end parts of the actuator element B being arranged in a Y-direction, and said optical element is moved in one direction of the Y-direction by one of pushing and pulling of one end part of the actuator element B due to the bending by applying said voltage.

9. An optical element module comprising:

an optical element; and a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending, wherein said optical element is supported by two actuator elements, said other end part of the actuator elements being coupled to a fixing frame, and said one end part of the actuator elements being coupled to said optical element via an arm member such that a displacement of the one end part can be transmitted to said optical element, one actuator element of said two actuator elements is arranged as an actuator element A, and said optical element is moved in one direction of an X-direction by one of pushing and pulling of one end part of the actuator element A due to the bending by applying said voltage, and the other actuator element is arranged as an actuator element B, and said optical element is moved in one direction of a Y-direction by one of pushing and pulling of one end part of the actuator element B due to the bending by applying said voltage.

10. An image pickup device comprising an optical element module including:

an optical element; and a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending in an image pickup optical system, wherein the optical element of said optical element module is moved on the plane perpendicular to the optical axis of said optical element at a time of image pickup to make hand movement correction, wherein the optical element module further includes:

an inner frame for containing said optical element such that said optical element is movable in an X-direction; and an outer frame for containing said inner frame together with the optical element such that said inner frame together with the optical element is movable in a Y-direction;

wherein said plurality of actuator elements include two actuator elements A whose principal planes are opposed to each other with said optical element interposed between said two actuator elements A in the X-direction, said one end part of each of said two actuator elements A being in contact with said optical element, and said other end part of each of said two actuator elements A being fixed to said inner frame, and two actuator elements B whose principal planes are opposed to each other with said inner frame interposed between said two actuator elements B in the Y-direction, said one end part of each of said two actuator elements B being in contact with said inner frame, and said other end part of each of said two actuator elements B being fixed to said outer frame, said optical element is moved in one direction of the X-direction by pushing due to said bending of one actuator element A of said two actuator elements A, and said inner frame and said optical element are moved in one direction of the Y-direction by pushing due to said bending of one actuator element B of said two actuator elements B.

11. An image pickup device comprising an optical element module including:

an optical element; and a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending in an image pickup optical system, wherein the optical element of said optical element module is moved on the plane perpendicular to the optical axis of said optical element at a time of image pickup to make hand movement correction, wherein said optical element is supported by four actuator elements bent at 90° to 180° in a direction of thickness as an initial shape, said other end part of the actuator elements being fixed to a fixing frame, and said one end part of the actuator elements being fixed to said optical element, two actuator elements of said four actuator elements are arranged as actuator elements A whose principal planes are opposed to each other with said optical element interposed between the actuator elements A in an X-direction, and said optical element is moved in one direction of the X-direction by one of pushing and pulling of one end part of at least one actuator element A due to the bending by applying said voltage, and the other two actuator elements are arranged as actuator elements B whose principal planes are opposed to each other with said optical element interposed between the actuator elements B in a Y-direction, and said optical element is moved in one direction of the Y-direction by one of pushing and pulling of one end part of at least one actuator element B due to the bending by applying said voltage.

12. An image pickup device comprising an optical element module including:

an optical element; and a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending in an image pickup optical system, wherein the optical element of said optical element module is moved on the plane perpendicular to the optical axis of said optical element at a time of image pickup to make hand movement correction, wherein said optical element is supported by two actuator elements bent at 180° in a direction of thickness as an initial shape, said other end part of said actuator elements being fixed to a fixing frame, and said one end part of said actuator elements being fixed to said optical element, one actuator element of said two actuator elements is arranged as an actuator element A with said optical element interposed between both end parts of the actuator element A, both end parts of the actuator element A being arranged in an X-direction, and said optical element is moved in one direction of the X-direction by one of pushing and pulling of one end part of the actuator element A due to the bending by applying said voltage, and the other actuator element is arranged as an actuator element B with said optical element interposed between both end parts of the actuator element B, both end parts of the actuator element B being arranged in a Y-direction, and said optical element is moved in one direction of the Y-direction by one of pushing and pulling of one end part of the actuator element B due to the bending by applying said voltage.

13. An image pickup device comprising an optical element module including:

an optical element; and a plurality of actuator elements each having an ion conductive polymer film in an oblong strip shape and electrodes disposed on both sides of said ion conductive polymer film, said actuator elements as a whole bending in a direction of thickness by applying a voltage between said electrodes;

said optical element being moved on a plane perpendicular to an optical axis of said optical element by the bending of said actuator elements;

wherein said plurality of actuator elements are arranged such that a direction of width of the oblong strip shape of said plurality of actuator elements is a direction of said optical axis and such that a direction of thickness of said plurality of actuator elements is perpendicular to said optical axis, another end part in a direction of length of said plurality of actuator elements is fixed such that one end part in the direction of length of said plurality of actuator elements is displaced by said bending to move said optical element, and at least one actuator element A of said plurality of actuator elements is disposed such that a direction in which said one end part of the actuator element A is displaced by said bending is orthogonal to a direction in which said one end part of another actuator element B is displaced by the bending in an image pickup optical system, wherein the optical element of said optical element module is moved on the plane perpendicular to the optical axis of said optical element at a time of image pickup to make hand movement correction, wherein said optical element is supported by two actuator elements, said other end part of the actuator elements being coupled to a fixing frame, and said one end part of the actuator elements being coupled to said optical element via an arm member such that a displacement of the one end part can be transmitted to said optical element, one actuator element of said two actuator elements is arranged as an actuator element A, and said optical element is moved in one direction of an X-direction by one of pushing and pulling of one end part of the actuator element A due to the bending by applying said voltage, and the other actuator element is arranged as an actuator element B, and said optical element is moved in one direction of a Y-direction by one of pushing and pulling of one end part of the actuator element B due to the bending by applying said voltage.

* * * * *